Nov. 24, 1959 H. BERKOVITS 2,913,971

COMBINATION RADIO-CAMERA

Filed June 10, 1955

INVENTOR.
HANI BERKOVITS
BY Isler & Ornstein
ATTORNEYS

United States Patent Office 2,913,971
Patented Nov. 24, 1959

2,913,971

COMBINATION RADIO-CAMERA

Hani Berkovits, East Cleveland, Ohio

Application June 10, 1955, Serial No. 514,657
4 Claims. (Cl. 95—12)

The present invention relates to a combination of a radio and a camera and more particularly to a portable radio or radio cabinet containing and concealing a photographic camera.

It is a primary object of my invention to provide a portable radio having a concealed camera associated therewith.

Another object of my invention is to provide a radio cabinet or case having means for removably supporting a camera therein.

A further object of my invention is to provide a combination radio-camera wherein a radio control element serves to actuate a concealed camera.

Still another object of my invention is to provide a radio cabinet with concealed apertures and movable closures therefor whereby a camera mounted within said cabinet may be trained upon a field of view when said closures are moved to expose said apertures.

Other objects and advantages of my invention will be apparent during the course of the following description.

In the accompanying drawings forming a part of this specification and in which like numerals are employed to designate like parts throughout the same, Fig. 1 is a front elevation of a form of portable radio having a camera concealed therein and embodying the features of my invention.

Figure 1:
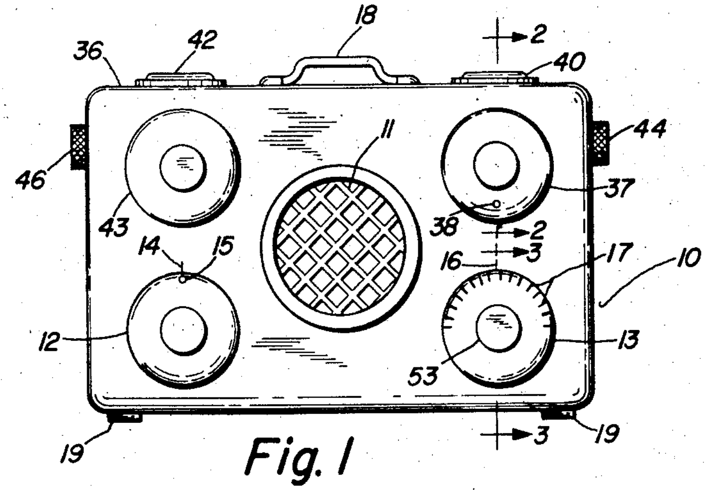

Referring more particularly to the drawings, I have shown in Fig. 1 a combination radio-camera which includes a case or cabinet 10 which may be formed of wood, molded plastic resin or other suitable material and which serves to contain or house the radio chassis and components as well as the camera, which will be described more fully hereinafter. The radio is conventional in character and therefore its components and method of operation are not shown nor described except as they relate to my invention.

The cabinet 10 is shown to be of rectangular form and includes a speaker grill 11 of ornamental appearance as well as control knobs 12 and 13 which are mounted exteriorly of the cabinet 10. I wish it to be understood that the particular design or arrangement of the cabinet 10 herein described is illustrative only, as my invention may be embodied in or adapted to numerous styles and forms of radio cabinets.

The control knob 12 is rotatable to switch the radio on and off as well as to control the volume of sound, as is well known and understood in the art. An index mark or symbol 14 may be provided on the cabinet 10 adjacent the knob 12 and a second index mark or symbol 15 may be provided on the marginal portion of the knob 12 so that there may be a convenient visual indication of the relative position of the knob. When the index marks 14 and 15 are in registry, the knob is in the "off" position.

The control knob 13 is rotatable to tune the radio to the desired frequency in the manner well known in the art. A reference mark or symbol 16 is provided on the cabinet adjacent the marginal portion of knob 13 and a series of indicia marks 17 are provided on the marginal portion of the knob to indicate or designate the frequencies or wave-lengths to which the radio may be tuned.

The cabinet 10 is provided with a handle 18 for convenience in carrying it and may also be provided with integral pads or projections 19 on which the cabinet stands when placed on a supporting surface.

Figure 2:
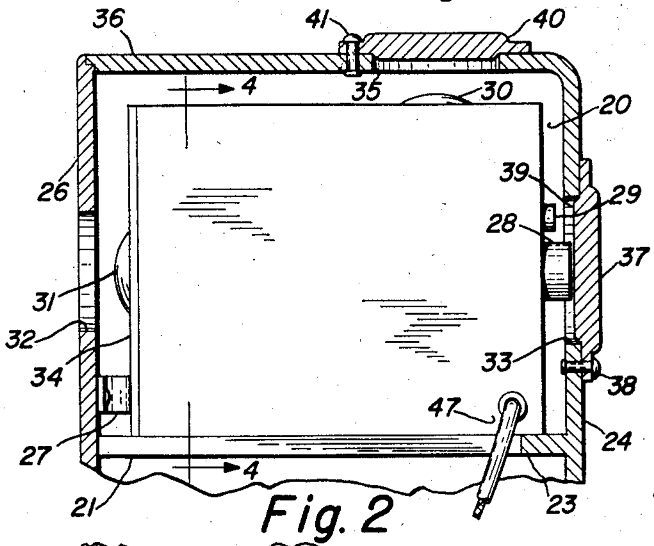
Fig. 2 is an enlarged fragmentary cross-sectional view taken on line 2—2 of Fig. 1, with the camera shown in elevation.
Figure 4:
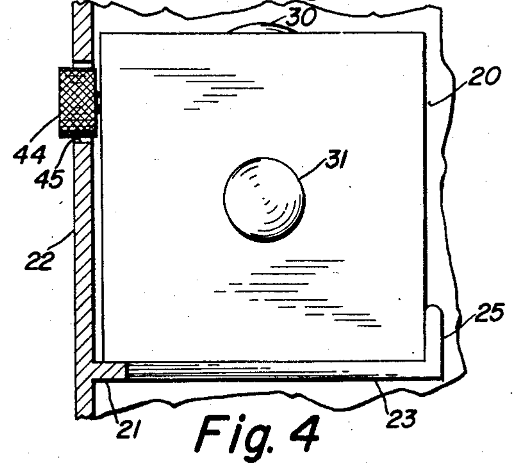
Fig. 4 is an enlarged fragmentary cross-sectional view taken as indicated on line 4—4 of Fig. 2 and showing certain details of the support structure for the camera, with the camera shown in elevation.

As shown in Figs. 2 and 4, a conventional form of photographic camera 20 is concealed within the interior of the cabinet 10 adjacent an upper corner thereof. The camera 20 is preferably of the box type, and is supported along one of the lower edges thereof by a horizontal bead or ledge 21 which projects inwardly from an adjacent side wall 22 of the cabinet. The forward lower edge of the camera is supported by a similar bead or ledge 23 which projects inwardly from the front wall 24 of the cabinet. The ledge 23 is provided with a short right-angled extension 25 which extends vertically upward and thus serves as an abutment which limits lateral movement or displacement of the camera. When the cabinet 10 is formed as a unitary molded article, the ledges 21 and 23 may be integral with the cabinet.

Access to the interior of the cabinet may be had by the removal of a back plate 26 which normally closes the back of the cabinet 10. The back plate 26 may be frictionally secured to the cabinet, or other suitable releasable securing means may be utilized. The back plate is provided with an inwardly extending projection which preferably is resilient or yielding, such as a leaf spring 27, and which is so positioned as to bear against the back 34 of the camera 20 and urge it into abutment with the interior of front wall 24 of the cabinet. By means of the aforementioned ledges 21, 23, the abutment 25 and the resilient projection 27, the camera is supported within the cabinet in proper position for operative use.

The camera 20 includes a shutter and lens assembly 28, a view finder 30 having a cooperating lens 29, and a film window 31. As seen in Fig. 2, the film window 31 is on the back 34 of the camera and an aperture 32 is provided in the back plate 26 so that the window 31 may be seen without requiring the removal of the back plate. An aperture 33 is provided in the front wall 24 of the cabinet in registry with the assembly 28 and the view finder lens 29 so that these elements of the camera can be exposed to the field of view. An aperture 35 is provided in the top 36 of the cabinet so as to permit observation of the view finder 30.

The aperture or opening 33 is concealed or closed by a cap or cover 37 which is pivotally secured to the front of the cabinet 20 as by pivot pin 38. The back of the cover 37 is provided with a raised portion 39 which nests in the aperture 33 and serves to secure the cover in closed position. The projection 39 is so slight, however, that the cap 37 can readily be moved to expose the aperture 33, when desired, and the cap will then be retained frictionally in the open position. For purposes of design or appearance, the cover 37 may simulate the appearance of the control knob 12 or 13. A similar cover 40 is pivotally secured, as by pivot pin 41, to the top 36 of the cabinet so as to overlie and conceal the aperture 35. For purposes of appearance or design, counterpart dummy projections 42 and 43, similar to covers 40 and 37, respectively, may be provided on the cabinet, as indicated in Fig. 1.

The camera 20 also includes a film winding knob 44, which as seen in Fig. 4, projects exteriorly of the cabinet through a suitable opening 45 in the side wall 22, so that it may be manipulated from the exterior of the cabinet. The camera mounting arrangement, previously described, permits the camera to be tilted or otherwise manipulated to bring the knob 44 into registry with the opening 45. Of, if more convenient, the knob 44 may be removed from the camera before the camera is mounted, in the cabinet and then the knob can be secured to the camera through the aperture 45. For purposes of appearance, a counterpart dummy projection 46, similar to knob 44, may be provided on the opposite side of the cabinet.

Figure 3:
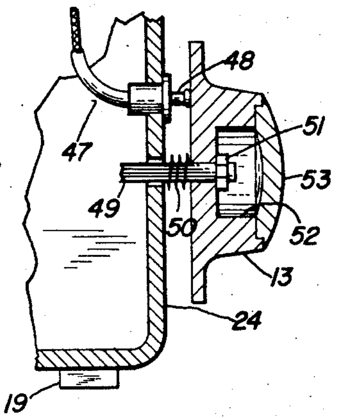
Fig. 3 is an enlarged fragmentary cross-sectional view taken on line 3—3 of Fig. 1 and showing details of the shutter actuating means for the camera.

The shutter mechanism of the camera 20 is operated by a Bowden wire type of remote control connector 47 which, as best seen in Fig. 3, has the plunger 48 thereof mounted in the front wall 24 of the cabinet in underlying relationship to one of the control knobs 12 or 13. In Fig. 3, I have shown the plunger 48 cooperatively associated with the tuning knob 13, although it will be understood that the control knob 12 could be utilized, if desired. The knob 13 is slidably mounted on its operating shaft 49, of non-circular cross-section, so as to rotate therewith. A coil spring 50 is mounted on the shaft 49 between the knob and cabinet and serves to yieldably maintain the knob 13 in spaced relationship to the cabinet, as determined by a nut 51 threadedly secured to the end of shaft 49. The knob is provided with a central recess or cavity 52 into which the end of the shaft 49 projects. This recess 52 may be concealed by a cover plate 53, frictionally secured to the knob. When it is desired to actuate the shutter mechanism of the camera, the knob 13 is pressed toward the cabinet in opposition to the spring 50, and thus actuates the remote control plunger 48 which operates the shutter mechanism.

In view of the foregoing description, it will be apparent that in utilizing the camera, it is first loaded with film exteriorly of the cabinet. The back plate 26 of the cabinet is then removed to permit the camera to be mounted within the cabinet. The connector 47 is then secured to the camera, and the back plate 26 is replaced. The camera is thus concealed within the cabinet, and may be used conveniently and unobtrusively whenever desired. When a photograph is to be taken, the cover 37 is swung open to expose the camera to the viewing field. If necessary, the cover 40 may also be swung open to utilize the view finder. The control knob 13 is then pressed to operate the camera, and the covers 37 and 40 are then returned to their closed positions. The film winding knob 44 can then be rotated and the position of the film can be observed through the aperture 32 in the back of the cabinet. When the camera is to be reloaded, the back plate 26 is removed, the connector 47 is detached, and the camera can readily be removed from the cabinet.

By utilizing a control knob of the radio to actuate the camera, the actuating linkage is effectively concealed and camouflaged. This arrangement permits candid photography and the like, as well as protecting the shutter actuator from being tampered with, as might occur if it were noticeable.

By properly designing the cabinet, as by the use of symmetrical design and dummy projections, the radio cabinet will appear conventional and will not betray the presence of the camera. The combined radio-camera unit is thus both convenient and novel.

For purposes of clarity of illustration, certain relative proportions of the elements of the described unit have been somewhat exaggerated.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. In a combined radio-camera, the combination of a radio unit, a cabinet enclosing said radio unit, a movable control knob for said radio unit, a camera contained within said cabinet, means provided on said cabinet for selectively exposing said camera to a field of view, shutter operating means underlying said knob and concealed thereby, and means on said knob for selectively engaging said shutter operating means to actuate said camera in response to predetermined movement of said control knob.

2. In a combined radio-camera, the combination of a radio unit, a cabinet enclosing said radio unit, a movable control knob for said radio unit mounted exteriorly of said cabinet, a camera contained within said cabinet, and a camera-shutter control element underlying said knob and concealed thereby, said shutter control element being engageable by and responsive to selective movement of said knob for actuating said camera.

3. A combination as defined in claim 2, in which said knob is rotatable relatively to said cabinet to control said radio unit and movable forward and away from said cabinet to control said shutter control element.

4. In a combined radio-camera, the combination of a radio unit, a cabinet enclosing said radio unit, a movable control knob for said radio unit, a camera removably mounted within said cabinet, said cabinet having an aperture therein in registry with the lens portion of said camera, a movable closure overlying said aperture, a camera-shutter operating element underlying said control knob, said knob being reciprocably movable relatively to said element and engageable therewith to actuate said shutter operating element, and yieldable means provided on said control knob for normally maintaining said knob out of engagement with said shutter operating element.

References Cited in the file of this patent

UNITED STATES PATENTS

| | | |
|---|---|---|
| 1,589,436 | Seebold | June 22, 1926 |
| 2,140,050 | Hart | Dec. 13, 1938 |
| 2,166,532 | Naden | July 18, 1939 |
| 2,487,868 | Grigsby | Nov. 15, 1949 |

OTHER REFERENCES

Washington Shopping News, Nov. 18, 1948, "Air King Camera-Radio."

Radio News, June 1940, page 21.